(12) United States Patent
Besson et al.

(10) Patent No.: US 10,007,397 B2
(45) Date of Patent: Jun. 26, 2018

(54) USER-INTERFACE FOR BEVERAGE PREPARATION MACHINES

(71) Applicant: Nestec S.A., Vevey (CH)

(72) Inventors: Francois Besson, Colombier (CH); Alexandre Perentes, Lausanne (CH)

(73) Assignee: Nestec S. A., Vevey (CH)

( * ) Notice: Subject to any disclaimer, the term of this patent is extended or adjusted under 35 U.S.C. 154(b) by 299 days.

(21) Appl. No.: 14/396,899

(22) PCT Filed: Apr. 23, 2013

(86) PCT No.: PCT/EP2013/058351
§ 371 (c)(1),
(2) Date: Oct. 24, 2014

(87) PCT Pub. No.: WO2013/160278
PCT Pub. Date: Oct. 31, 2013

(65) Prior Publication Data
US 2015/0082989 A1    Mar. 26, 2015

(30) Foreign Application Priority Data

Apr. 24, 2012 (EP) .................................. 12165274

(51) Int. Cl.
*A47J 31/52* (2006.01)
*G06F 3/0482* (2013.01)
(Continued)

(52) U.S. Cl.
CPC .......... *G06F 3/0482* (2013.01); *A47J 31/407* (2013.01); *A47J 31/4407* (2013.01);
(Continued)

(58) Field of Classification Search
USPC ............................................. 99/280
See application file for complete search history.

(56) References Cited

U.S. PATENT DOCUMENTS 6,759,072 B1    7/2004  Gutwein
9,051,162 B2 *  6/2015  Peters .................. B67D 1/0041
(Continued)

FOREIGN PATENT DOCUMENTS

EP    1890271 A1    2/2008
EP    2309902 B1    12/2011
(Continued)

OTHER PUBLICATIONS

EP13717790.3; Nestec S. A.; European Communication, dated Jan. 4, 2016.
(Continued)

*Primary Examiner* — Anne M Antonucci
*Assistant Examiner* — Renee LaRose
(74) *Attorney, Agent, or Firm* — Dunlap Codding, P.C.

(57) ABSTRACT

The invention relates to a Beverage preparation machine comprising:
  a user-interface having a selection element for selecting a first value related to at least one property of a beverage;
  an ingredient processing module for a preparation of a beverage according to the first value, with at least one ingredient supplied in a capsule.
The user-interface comprises a feedback element configured to present a default value for the first value, the default value being computed according to values previously used for said at least one property by the machine to prepare beverages.

13 Claims, 5 Drawing Sheets

(51) Int. Cl.
  *A47J 31/44* (2006.01)
  *A47J 31/40* (2006.01)
  *G06F 3/0484* (2013.01)

(52) U.S. Cl.
  CPC ........... *A47J 31/4492* (2013.01); *A47J 31/52* (2013.01); *G06F 3/04842* (2013.01)

(56) References Cited

U.S. PATENT DOCUMENTS

| | | | |
|---|---|---|---|
| 2003/0006281 A1* | 1/2003 | Thomas | B67D 1/0884 235/385 |
| 2008/0095904 A1* | 4/2008 | Sullivan | A47J 31/32 426/431 |
| 2010/0071563 A1* | 3/2010 | Ryser | A47J 31/3633 99/295 |
| 2010/0162897 A1* | 7/2010 | Ozanne | A47J 31/407 99/280 |
| 2010/0263543 A1* | 10/2010 | Krauchi | A47J 31/4403 99/280 |
| 2011/0120316 A1* | 5/2011 | Castellani | A47J 31/52 99/280 |
| 2011/0168026 A1* | 7/2011 | Cahen | A47J 31/4407 99/280 |
| 2011/0212229 A1* | 9/2011 | McLaughlin | A47J 31/3614 426/231 |
| 2011/0265657 A1* | 11/2011 | Icardi | A47J 31/3628 99/280 |
| 2015/0135962 A1 | 5/2015 | Jarisch et al. | |

FOREIGN PATENT DOCUMENTS

| | | |
|---|---|---|
| GB | 2442223 A | 4/2008 |
| JP | 2-46289 | 3/1990 |
| JP | 2003506108 A | 7/2004 |
| JP | 2004342003 A2 | 12/2004 |
| JP | 2010526619 A | 8/2010 |
| JP | 201166500 A2 | 10/2012 |
| WO | 200112035 A2 | 2/2001 |
| WO | 200112035 A3 | 2/2001 |
| WO | 2003005295 A1 | 1/2003 |
| WO | 2009016490 A2 | 2/2009 |
| WO | 2012059892 A1 | 5/2012 |
| WO | 2013160318 A1 | 10/2013 |

OTHER PUBLICATIONS

International Search Report dated May 15, 2013 in PCT/EP13/58351, filed Apr. 23, 2013.
Written Opinion of the International Search Report, dated May 15, 2013 in PCT/EP13/58351, filed Apr. 23, 2013.
JP Application No. P2015-507492; Office Action dated Nov. 15, 2016 with English Translation.
International Search Report, dated Jun. 19, 2013 in PCT/EP2013/05/414, filed Apr. 24, 2013.
Written Opinion of the International Searching Authority, dated Jun. 19, 2013 in PCT/EP2013/05/414, filed Apr. 24, 2013.

* cited by examiner

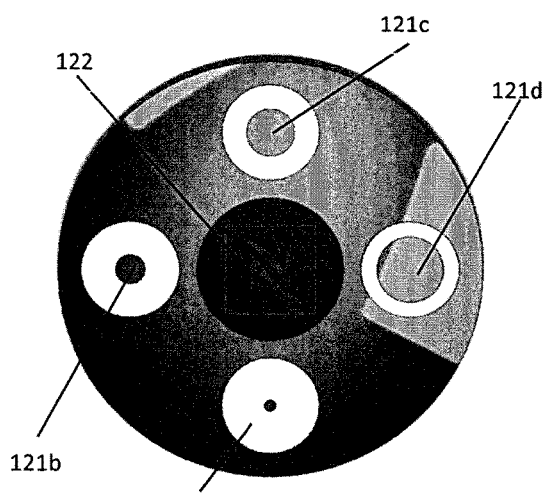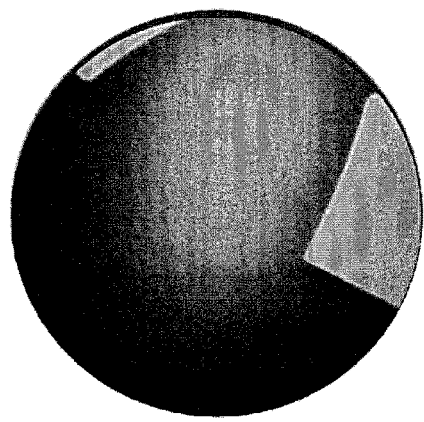
Fig. 5a  Fig. 5b
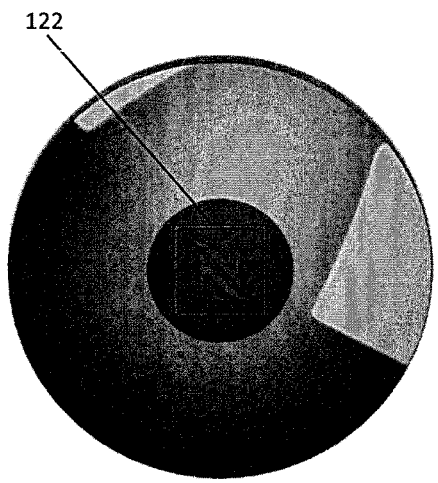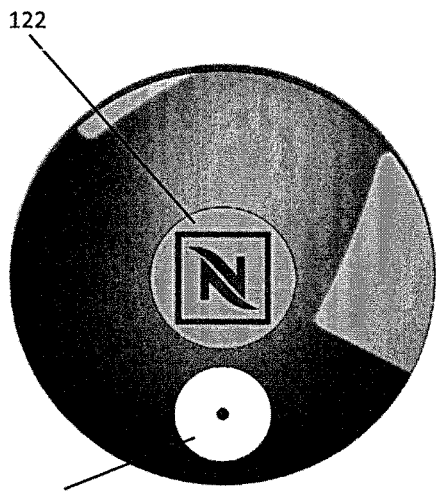
Fig. 5c  Fig. 5d

USER-INTERFACE FOR BEVERAGE PREPARATION MACHINES

FIELD OF THE INVENTIVE CONCEPTS

The field of the inventive concepts pertains to beverage preparation machines, in particular using capsules of an ingredient of the beverage to be prepared, such as beverage preparation machines having a passage for inserting a beverage ingredient into the machine, in particular an ingredient supplied in the form of a preportioned ingredient capsule, and a member for covering and uncovering the passage, as desirable during normal use of the machine.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

While it is desirable to increase the number of different functionalities and to allow the user to prepare beverages according to its own preferences, this is generally achieved at the cost of the simplicity and efficiency.

EP2309902 discloses a machine for dispensing beverages having a user interface—customized menu—that is capable of being adapted to the preference of a given user, said user being recognized by a biometric arrangement. This solution requires additional steps and equipments to identify the user for adapting its interface.

BRIEF DESCRIPTION OF THE DRAWINGS

The presently disclosed and/or claimed inventive concept(s) will now be described with reference to the schematic drawings, wherein:

FIGS. 5a, 5b, 5c and 5d show an embodiment of the user-interface;

DETAILED DESCRIPTION

Figure 1:
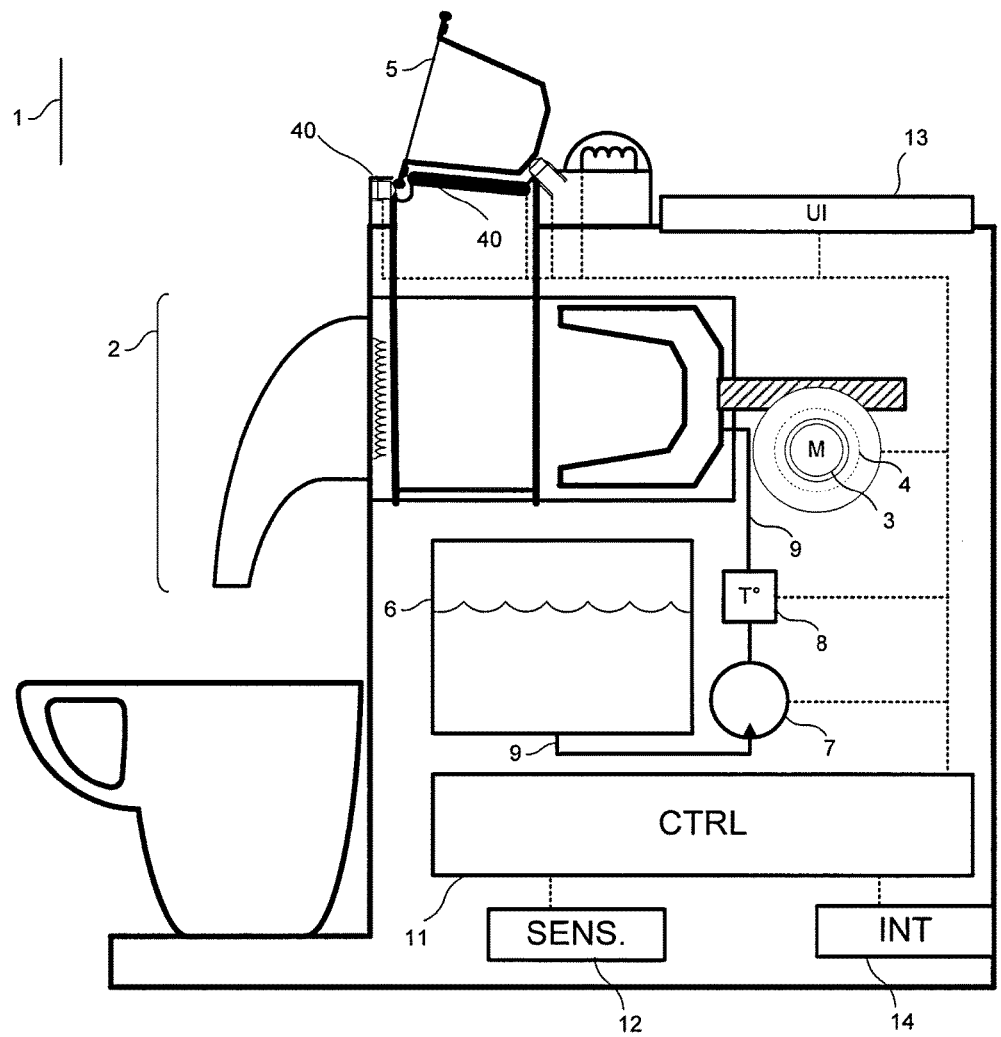
FIG. 1 is a schematic view of a beverage machine according to an embodiment.

One non-limiting object of the presently disclosed and/or claimed inventive concept(s) is related to providing more convenience, and to reducing user's interventions required before starting the preparation of a beverage. Another non-limiting object is to provide added value functionalities such as semi-automatic or automatic preparation modes. Another non-limiting object is to allow the configuration of the preparation process, according to the preferences of a user, in a convenient, quick and user-friendly way.

One or more of these objects are met by a machine according to the independent claim(s). The dependent claims further provide solutions to these objects and/or additional benefits.

More particularly, according to a first non-limiting aspect, the presently disclosed and/or claimed inventive concept(s) relates to a beverage preparation machine comprising a user-interface having a selection element for selecting a first value related to at least one property of a beverage. The machine comprises an ingredient processing module for a preparation of a beverage according to the first value, with at least one ingredient supplied in a capsule. The user-interface comprises a feedback element configured to present a default value for the first value, the default value being computed according to values previously used for said at least one property by the machine to prepare beverages.

The beverage preparation machine can be an in-home or out of home machine. The machine may be for the preparation of coffee, tea, chocolate, cacao, milk, soup, baby food, etc. . . . The machine may be arranged for preparing within the beverage preparation module a beverage by passing hot or cold water or another liquid through a capsule containing an ingredient, such as a flavouring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. The ingredient is optionally inserted into the processing module and/or evacuated therefrom within an ingredient capsule, e.g. an aluminium or plastic or paper enclosure containing the ingredient.

The machine typically includes a control unit, in particular a unit for controlling the ingredient processing module. The control unit may comprise a power management module arranged to power the control unit and optionally further electric components, such as the user-interface and/or a thermal conditioner in particular a heater, when the control unit is unpowered or in standby state. The machine can comprise a motor for driving the processing module: from a configuration for processing the ingredient; to an ingredient transfer configuration for inserting said ingredient into the processing module and/or removing said ingredient therefrom; and/or vice versa. The motor may be arranged to drive the processing module into: the processing configuration when the cover is moved into the covering position; and/or the transfer configuration when the cover is moved into the uncovering position. A motorization for the processing module is for instance disclosed in PCT/EP11/057233, PCT/EP11/057235 and PCT/EP12/050033. A further motorization of the beverage preparation module is for example disclosed in EP 1 767 129.

The machine may have a control unit for controlling the ingredient processing module, the control unit being arranged to initiate automatically beverage preparation when the ingredient is inserted into the processing module and the cover is moved into the covering position. Insertion of the ingredient into the module may be detected by any system, e.g. as known in the art such as an optical detection.

The control unit may be arranged to initiate automatically a shut-down or standby process and/or a service process, when no ingredient is inserted in the processing module. Likewise, the absence of insertion of the ingredient into the module may be detected by any suitable system, e.g. as mentioned above.

Typically, the user-interface is arranged to allow the user choosing the first value with the selection element, for example amongst a plurality of individual value, or within a range. The selection element may comprise buttons, wheels, levers, touch-sensitive elements, pad, keyboard, or any combination of these elements. The feedback element may comprise displays, lights, sound emitters, vibrant elements, mechanical elements, or any combination of these elements. In particular, the selection element and the feedback element may be grouped in one component, for example a mechanical push button provided with lights or a touch-sensitive display.

For example, the default value may be computed according to the last eleven values previously used for said at least one property by the machine to prepare beverages. More particularly, the default value may be computed by identifying the most frequently selected value for preparing a beverage amongst the last eleven values previously used.

In an embodiment, the selection element comprises a first button for selecting a first volume of beverage to prepare and a second button for selecting a second volume of beverage to prepare. The ingredient processing module is configured to prepare the first volume of beverage if the user has pressed the first button, or the second volume of beverage if the user has pressed the second button. The default value is set to the first volume if the first value is the most frequently selected value amongst the last eleven values previously used, or to the second volume if the second value is the most frequently selected value amongst the last eleven values previously used. If the default value is set to the first volume, then the first button is lightened and the second button is not lightened. If the default value is set to the second volume, then the second button is lightened and the first button is not lightened. Then the user has a visual feedback of which default value is proposed. In an embodiment, the ingredient processing module is configured to prepare the volume of beverage according to the default value when the preparation process is triggered and if the user has not selected another value for the volume of beverage to prepare.

In an embodiment, the machine further comprises an interaction logger configured to record in a log the first value used by the ingredient processing module for preparing the beverage. The machine also comprises a controller adapted to compute the default value according to the content of the log. In one particular, non-limiting embodiment, the content of the log is preserved when the machine is switched off. For instance, the log may be stored on a permanent storage, in particular that keeps the data or its contents regardless if the power of the beverage is turned off. The log may contain entries, each entry comprising the first value.

The controller may be adapted to compute the default value by determining the most frequently chosen value according to the content of the log, or by determining a mean value based upon the content of the log. The controller may also be adapted to compute the default value by determining a most-likely value based upon the content of the log and information related to one or a combination of the following information: current time, current date, identification data related to the capsule, recipes for preparing the beverages. For instance, if the type of the capsule inserted in the preparation module is known or recognized, for example the type of ingredients enclosed within the capsule inserted in the ingredient processing module, the default value may be computed by determining the most frequently selected value for the at least one property, amongst the last eleven values previously used to prepare a beverage with this recognized type of capsules. For example, for a first types of capsule, the most frequently selected value amongst the last eleven values previously used for preparing the first type of capsule may be a third value, whereas for a second type of capsule, the most frequently selected value amongst the last eleven values previously used for preparing the second type of capsules may be a fourth value. Then the default value is set to the third value if a capsule of the first type is inserted in the ingredient processing module. The default value is set to the fourth value if a capsule of the second type is inserted in the ingredient processing module.

The user-interface may be configured to set the first value to the default value after each preparation of a beverage and/or at each power-up of the machine.

The at least one property may relate to a volume of beverage to be prepared. Typically, the volume of beverage corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . . In particular, a coffee machine may be configured for dispensing espressos, e.g. an adjustable volume of 20 to 60 ml per serving, and/or for dispensing lungos, e.g. a volume in the range of 70 to 150 ml per serving.

The at least one property may relate to a recipe for preparing a beverage and/or any parameters having influence on the preparation of the beverage, like the temperature of the dispensed beverage.

The selection element may be adapted to allow modifications of the first value during the preparation of the beverage, the ingredient processing module being configured to take into consideration said modifications for preparing said beverage if it is still possible. For example, the controller may have computed a default value corresponding to the first volume according to the content of the log, and the ingredient processing module may have begin the preparation of the first volume of beverage according to the default value. However if the selection element is used by the user to select the second volume during the preparation process, the processing module may be configured to take into consideration this event. For instance, if the second volume is greater than the first volume, the processing module may be configured to continue the preparation of the beverage until the second volume is reached. If the second volume is smaller than the first volume, if the volume of beverage already produced is inferior to the second volume, the processing module may be configured to continue the preparation of the beverage until the second volume is reached, or to stop the preparation if the volume of beverage already produced is greater of equal to the second volume. As a consequence, the user may adapt the production of the beverage to its wishes, even after the start of the preparation.

In an embodiment, the beverage preparation machine comprises a positioner arranged to hold at least one capsule out of the ingredient processing module. The machine further comprises a sensing arrangement adapted to detect an event related to the insertion by a user of a capsule and/or the presence of the capsule on or into the positioner. The machine is configured, upon detection of the event, to transfer the capsule to the ingredient processing module by using transfer means, and then to start the preparation of the beverage. In particular, the machine may be configured to start the preparation of the beverage according to the default value and/or other default parameters. Consequently, the user has only to put a capsule in the positioner to trigger automatically the preparation of a beverage. This simple, quick and intuitive gesture replaces the traditional sequence consisting in opening the brewing unit, inserting a capsule, then closing the brewing unit and pressing a start button. Moreover, the user is free to place a capsule of its choice into the positioner: as consequence, the user can choose easily what type of capsule he wants to use to prepare its beverage, without having to fill in a cartridge or a magazine for example.

Moreover, the positioner may be placed outside the ingredient processing module, in particular outside a brewing unit of the ingredient processing module, and more particularly (but not by way of limitation), may be in a position where it is visible and accessible to the user, so that the latter may have a visual feedback. Consequently, if an object is placed into the positioner and is not detected as a capsule by the sensing arrangement, the user can more easily extract it away from the positioner. Also, the preparation of the beverage will not start automatically if a capsule is not detected into the positioner, improving the level of safety of the machine. It is also possible to provide other means for feeding the positioner with capsules put down by a user, for instance guiding means or luge arranged to transfer capsules to the positioner from an additional storage area.

In particular, the sensing arrangement may be adapted to detect the event by receiving or reading information from the capsule, and/or by measuring at least one of the following characteristic of the capsule: spectral property, colour, electrical property, resistivity, capacitance, electromagnetic property, magnetic induced field, mechanical property, geometry, weight, identifying information, code bar, emitted or reflected signal. The sensing arrangement may be further adapted to identify a type for the capsule; the machine is then configured to start the preparation of the beverage according to parameters adapted to, or depending of, the identified type of the capsule.

The default value may be computed by the controller beverage according to the recognized type. For instance, the default value may be computed by selecting the most frequently selected volume for the recognized type.

In an embodiment, the machine is further configured to transfer the capsule to the ingredient processing module upon detection of the event as soon as the machine is ready to start the preparation of a beverage with the capsule. For example, if the machine is currently preparing another beverage, the user can still position a capsule into the capsule positioner: the machine will use said capsule as soon as possible. It may be also useful to prepare one beverage with a plurality of capsules of the same type, for example to obtain a higher volume, or with a plurality of capsules of the different type, for example to obtain a beverage made of a plurality of ingredients like a cappuccino. The machine can also be not ready to prepare the beverage, for example if its water tank is empty or not filled enough to prepare the beverage: then the user can still place a capsule into the positioner, and fill the water tank with water to start automatically the preparation of the beverage.

In an embodiment, the ingredient processing module comprises a first part and a second part which are movable relatively one another. The processing module is configurable into an opened position wherein a passage is provided between the first and second part for allowing the insertion of a capsule. The machine further comprises closing means arranged to close at least partially the passage. The machine is further configured to operate the closing means so as to open the passage upon the detection of the event. Moreover, the ingredient processing module may have only one unique passage for allowing the insertion of capsule, the closing means being then capable of closing the sole possible entry to feed the ingredient processing module. By using closing means, it is possible to physically obstruct the passage leading to the ingredient processing module, more particularly when the latter is in its opened position and whereas no capsule has been detected yet. Hence, unless the event related to the insertion of a capsule by the user into the positioner is detected, the entry into the processing module of an unexpected object is prevented. The level of safety of the machine is thus improved, the passage leading to a chamber of the processing module being closed to any object not detected as a capsule.

The positioner may be positioned relatively to the passage so as to allow the capsule to be transferred, upon the detection of the event, into the ingredient processing module at least partially under the action of the gravity force. The transfer means are then simplified since they may comprise only guiding means for guiding the capsule. In particular, the positioner may be positioned above the ingredient processing module and the passage, for instance, on top of the housing of the machine, to benefit from the action of the gravity.

The machine may also be further configured to operate the closing means so as to open the passage upon the detection of the event provided that the machine is currently ready to prepare a beverage. So, if the machine is not ready, the capsule will not leave the capsule positioner: as a consequence, the user could retrieve easily the intact capsule if he wants.

The closing means may be driven by a motorized arrangement for opening the passage upon the detection of the event. The closing means may be mechanically linked by a mechanical coupling means with the first part and/or a second part of the ingredient processing module for opening the passage upon the detection of the event.

In an embodiment, the closing means are part of the positioner. For example, the positioner may comprise a seat adapted to hold the capsule, the closing means comprising a sliding cover forming part of the seat: the machine is further configured to operate the closing means for opening the passage upon the detection of the event by translating the sliding cover. In another example, the positioner comprises a rotating body in which a seat adapted to hold the capsule is formed, the closing means comprising a closing part: the machine is configured, upon detection of the event to transfer the capsule to the ingredient processing module by rotating the rotating body into a position in which the closing part close at least partially the passage.

A beverage machine 1 according to an embodiment is illustrated schematically on FIG. 1. The beverage machine comprises a brewing unit 2 which is coupled with an electrical motor 3 driving transmission means 4 for moving the brewing unit between an opened and a closed position. The brewing unit is represented in the opened position on FIG. 1. The brewing unit allows the preparation of a beverage from a capsule 5 containing at least one ingredient, e.g. ground coffee or tea or chocolate.

Figure 2:
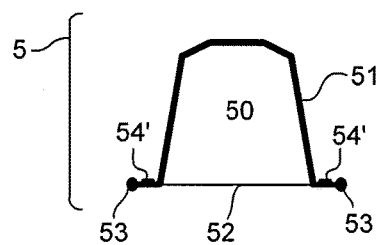
FIG. 2 is a cross section of a capsule adapted to be used by the beverage machine to prepare a beverage.

As shown in FIG. 2, the capsule has a generally cup-shaped body 51 and a covering membrane 52. Membrane is assembled to cup along a peripheral rim 54 of cup. The rim may be covered with a seal 54', e.g. made of elastomeric or plastic material. Furthermore, the capsule in particular the rim and/or the membrane may bear a ring or toroid 53, e.g. for assisting manufacturing and/or handling of the capsule. Such capsule forms a packaging for containing an ingredient 50, e.g. ground coffee, of a beverage to be prepared with the beverage preparation machine. In an embodiment, the capsule forms a gastight packaging, e.g. made of aluminium or an aluminium-alloy. Alternatively, the capsule may be more or less pervious, e.g. perforated and/or made of organic, in particular plastic material, e.g. biodegradable material. The capsule's cup and/or the capsule's membrane may be made of a monolithic material, e.g. a metallic material or a conductive ceramic and/or conducive organic material, or may be made of a structure covered or containing a conductive material, e.g. a conductive coating or track, e.g. an aluminium, iron and/or copper coating or track.

As represented on FIG. 1, water supply means are also provided as a part of the machine, such means including a water reservoir 6, a water pump 7 and a water heater 8. Water circulates in a water circuit 9 which is linked to the brewing unit. Controller is also provided in the machine. The controller includes typically a control unit 11, sensors 12 and a user interface 13. The control unit includes processor(s), memories and programs enabling to provide appropriate inputs to and receive outputs from the different activation means of the machine in particular, the pump, heater, motor and user interface.

Figure 3A:
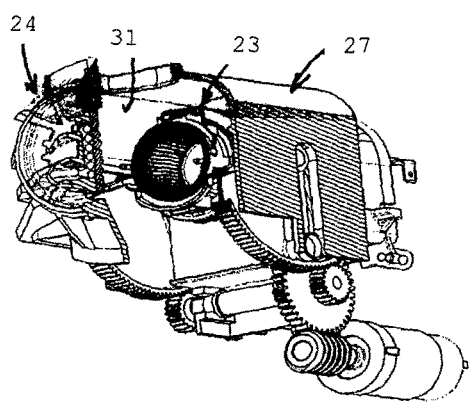
FIG. 3a is a partial cross section perspective representation of a brewing unit of the beverage machine of FIG. 1 in open position.
Figure 3B:
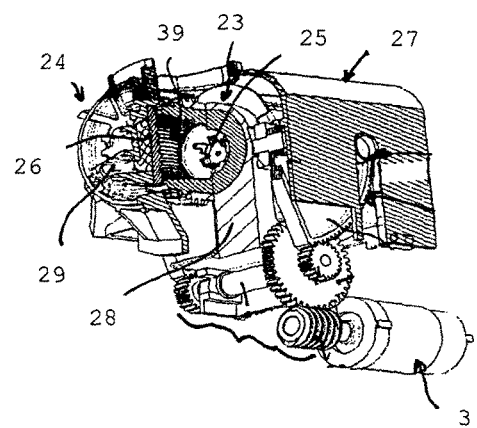
FIG. 3b shows a partial cross section perspective representation of a closed brewing unit of the beverage machine of FIG. 1 in an "empty closure mode"
Figure 3C:
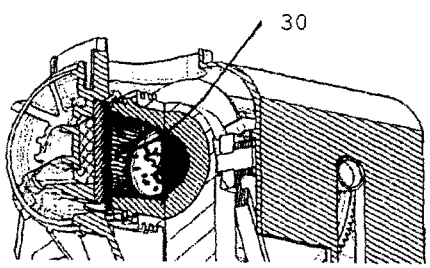
FIG. 3c shows a partial cross section perspective representation of a closed brewing unit of the beverage machine of FIG. 1 in a "capsule closure mode"

Referring now to FIGS. 3*a*, 3*b*, and 3*c*, there is shown therein an exemplary motorized embodiment of the brewing unit. The brewing unit more particularly comprises a first assembly 23 and a second assembly 24 which are movable relatively one another. In this particular mode, the rear injection assembly 23 represents the capsule cage including injection blades 25. The front assembly 24 represents the beverage delivery assembly and includes a capsule delivery plate 26. The front assembly is associated to an outer casing and the whole is movable relatively to the rear injection assembly 23 which remains fixed to a frame 28. The front delivery assembly 24 comprises a beverage outlet 29. The front delivery assembly 24 is moved relatively to the rear injection assembly 23 by means of the motor 3 which drives the transmission means 4. In the opened position (FIG. 3*b*), a passage 31 is provided between the first and second assemblies 23, 24 for allowing the insertion of a capsule. In the closed position (FIG. 3*c*), a brewing chamber 39 is provided.

The beverage machine further comprises a capsule positioner 40 having a seat adapted to store at least one first capsule out of the brewing chamber, and particularly may be outside the brewing unit. In an embodiment, the positioner is arranged to store at least a second capsule, out of the brewing chamber, and particularly may be outside the brewing unit. The capsule positioner may comprise a closing apparatus operable for switching the capsule holder between at least an opened position and a closed position. In the closed position, the capsule holder is configured to store the capsule in the seat. In the opened position, the capsule holder is configured to allow a capsule, pre-positioned into the capsule seat, entering the brewing unit chamber. More particularly, the capsule positioner is arranged so as to allow a capsule entering and passing through the passage of the brewing unit before reaching the capsule chamber, when the capsule positioner is set in its opened position. The capsule may be transferred from the capsule positioner in the opened position to the brewing unit by transfer means such guiding means, motorized elements, moving parts, actuators and/or any other means adapted to move the capsule out of the seat to the brewing unit, and in particular to the brewing unit chamber. Advantageously, the closing apparatus is arranged to close at least partially the passage when the capsule positioner is in its closed position, notably in order to prevent the unsafe entry of an unexpected object into the brewing unit.

Figure 4A:
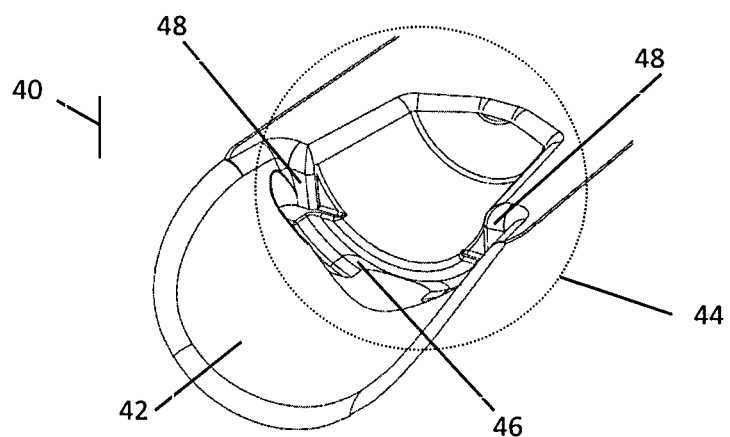
FIG. 4a is a detailed view of a capsule positioner of the beverage machine of FIG. 1, in a closed position, according to a first embodiment.
Figure 4B:
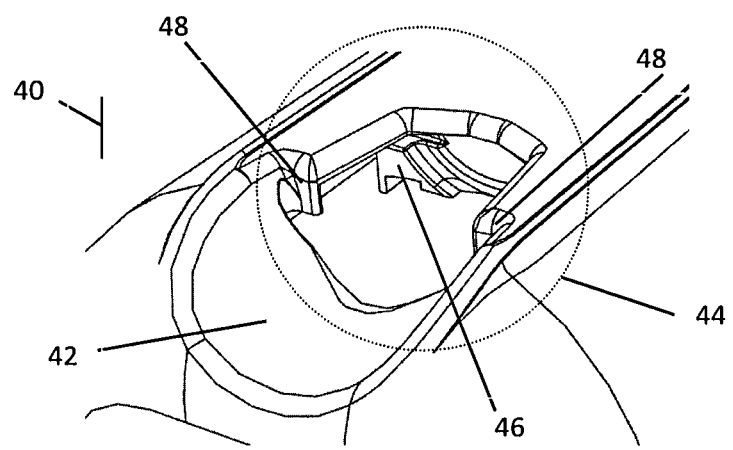
FIG. 4b is a detailed view of a capsule positioner of the beverage machine of FIG. 1, in an open position, according to a first embodiment.

In a first embodiment, as shown in FIGS. 4*a* and 4*b*, the capsule seat 44 is formed in a housing 42 that may be integrated to the housing of the beverage machine as shown on FIGS. 4, 5. Alternatively, the capsule seat may be a separate part mounted on the housing of the beverage machine (not represented on the drawings). The capsule seat may comprise guides 48 formed into the housing 42 and surrounding the capsule seat, in particular to ease the positioning of a capsule by a user when the capsule positioner is in the closed position, and/or to improve the holding of a capsule in the seat. Moreover, the guides may be arranged to guide the movement of the capsule when the capsule positioner is switched to its opened position, and to prevent a capsule inserted into the seat to be translated with the closing apparatus, for example when the capsule holder is switched from the closed to the opened position.

In the first embodiment, for switching the capsule positioner between the opened and closed positions, the closing apparatus 46 may be driven by a motorized arrangement, controlled for example by the control unit or by an additional controller. Alternatively, the closing apparatus may be mechanically linked by a mechanical coupling means with the brewing unit, and in particular with the first assembly 23 and/or the second assembly 24, so as to switch between the opened and closed positions depending on whether the brewing unit is opened or closed. For instance, the mechanical coupling means may be arranged to open the closing apparatus when the brewing unit is in the opened position, and to close the closing apparatus otherwise. In an embodiment, the closing apparatus may be rigidly fixed to a part of the brewing unit or be formed by a part of the brewing unit, in particular by the first assembly 23 and/or the second assembly 24. The capsule holder housing comprises an opening large enough to let a capsule pass through it. In particular the outlines of said opening may reproduce sensibly the outlines of a longitudinal cross section profile of a capsule. When the capsule positioner is closed, as illustrated on FIG. 4*a*, the base of the capsule seat is formed by the closing apparatus. When the capsule positioner is opened, as illustrated on FIG. 4*b*, the closing apparatus is configured to authorize a capsule positioned onto the capsule seat 44 to leave the capsule seat. In particular, the capsule positioner 40 is positioned on the upper part of the housing of the beverage machine to let a capsule falling into the passage 31 under the action of the gravity force, when the capsule positioner is opened.

In the first embodiment, the closing apparatus 46 may be included in the capsule seat and forms part of it. More particularly, the closing apparatus may comprise a sliding cover inserted into lateral guides of the housing. The shape of the sliding cover may comprise an area with a recess having sensibly the outside shape of a part of the capsule. The sliding cover may be translated, along one longitudinal axis defined by the configuration of the lateral guides, to switch the positioner between its opened and closed positions. The translation of the sliding cover may be performed using a motorized arrangement (not represented), and/or with the help of mechanical coupling means (not represented) linked with the first and/or the second assembly of the brewing unit (not represented), and/or may be part of the first or the second assembly of the brewing unit itself (not represented).

Referring now to FIG. 5, there is shown therein an embodiment of the user-interface 13. In this embodiment, the user-interface is a touch-sensitive interface provided with sensitive area. The user may interact with the machine touching surfaces of the interface, each surface corresponding to choices offered to the user depending on the current status of the machine. In particular, the user interface may comprise a confirmation area 122, and a selection element 121 comprising four selection area 121*a*, 121*b*, 121*c*, 121*d*. The selection element 121 allows a user to select a value related to at least one property of a beverage to prepare, for example the volume of beverage to prepare amongst four different values. For example, the selection area 121*a*, 121*b*, 121*c*, 121*d* may be arranged respectively to allow a user to select a first volume, a second volume, a third volume and a fourth volume respectively of beverage to be prepared by the ingredient processing module.

For example, when the machine is switched off, the user-interface is empty and deactivated, as illustrated in FIG. 5*b*, in particular the selection element 121 and the confirmation area 122 are deactivated, touching the corresponding area having then no effect. In this embodiment, the selection element 121 and the confirmation area 122 are not visible. When the machine is switched on, as illustrated in FIG. 5*c*, the confirmation area 122 may remain deactivated but visible and lightened in a specific colour (red, orange, for example) and/or blinking, until the machine is ready to prepare a beverage (heating element ready for instance) and/or a capsule is introduced in the positioner or in the ingredient processing module. A default value is computed according to values previously used for said at least one property by the machine to prepare beverages. For example, the default value may be computed by identifying which value amongst the first, the second, the third and the fourth volume has been the most frequently be used by the ingredient processing module to prepare the last eleven beverages. In another embodiment, For example, the default value may be computed by identifying which value amongst the first, the second, the third and the fourth volume has been the most frequently be used by the ingredient processing module to prepare the last eleven beverages with the recognized type of the capsule inserted in the positioner or in the ingredient processing module. When the default value has been computed, the corresponding selection area 121*a*, 121*b*, 121*c*, 121*d* is configured to become visible, for example, highlightened/lightened with a default colour (green for instance), as illustrated on FIG. 5*d*. The other selection area 121*a*, 121*b*, 121*c*, 121*d* may be configured to remain invisible but activated, letting the user select different value, as illustrated on FIG. 5*d*. Alternatively, the other selection area 121*a*, 121*b*, 121*c*, 121*d* may be configured to become visible and activated, but lightened with another colour (yellow for instance) to indicate that they are not corresponding to the default value but allowing the user selecting a different values (not illustrated on FIG. 5). Then the selection ement 121 is also used as a feedback to inform the user which default value has been computed.

When the machine is ready, and the default value as been computed and displayed, the confirmation area 122 may be activated and remain visible and lightened in a default colour (green, for example), indicating that the machine is ready to prepare a beverage. If the user touch the confirmation area 122, the beverage is prepared with the currently selected value, i.e. the default value if the user has not entered another value by touching another selection area before.

Figure 6:
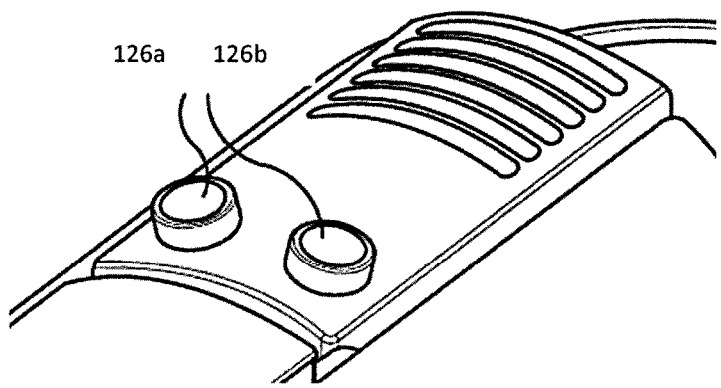
FIG. 6 shows another embodiment of the user-interface.

Referring now to FIG. 6, there is shown therein an embodiment of the user-interface 13. In this embodiment, the user-interface comprises two mechanical buttons 126*a* and 126*b* provided with a light emitter. The user may interact with the machine pressing said buttons, each one corresponding to a value related to at least one property of a beverage to prepare, for example the volume of beverage to prepare amongst two different values. For example, the buttons 126*a*, 126*b* may be arranged respectively to allow a user to select a first volume, and a second volume respectively of beverage to be prepared by the ingredient processing module. The buttons may be deactivated but visible and lightened in a specific colour (red, orange, for example) and/or blinking, until the machine is ready to prepare a beverage (heating element ready for instance) and/or a capsule is introduced in the positioner or in the ingredient processing module. A default value is computed according to values previously used for said at least one property by the machine to prepare beverages. For example, the default value may be computed by identifying which value amongst the first, and the second volume has been the most frequently be used by the ingredient processing module to prepare the last eleven beverages. In another embodiment, For example, the default value may be computed by identifying which value amongst the first, and the second volume has been the most frequently be used by the ingredient processing module to prepare the last eleven beverages with the recognized type of the capsule inserted in the positioner or in the ingredient processing module. When the default value has been computed, the corresponding buttons 126*a*, 121*b* is configured to lightened with a default colour (green for instance) whereas the other button may be configured not to be lightened but remaining activated. Alternatively, the other button may be configured to become visible and activated, but lightened with another colour (yellow for instance) to indicate that they are not corresponding to the default value but allowing the user selecting a different values. Then the buttons 126 are also used as a feedback to inform the user which default value has been computed.

When the machine is ready, and the default value as been computed and displayed, the preparation process may be triggered using another user-interface element (for instance, by closing a slider, or by pressing a start button) or automatically upon detection of an event (insertion of a capsule inside the positioner, introduction of the capsule inside the ingredient processing unit, etc). The user may change the value used to prepared the beverage by pressing the button not corresponding to the default value.

A series of typical use cases of the machine according to the embodiments will now be discussed.

EXAMPLE 1

The machine is powered on. The capsule positioner is closed, no capsule being inserted into the capsule seat. The brewing unit is opened. A user puts into the capsule positioner a capsule. Since the capsule positioner is closed, the capsule is hold into the capsule seat, and cannot enter the brewing chamber. The detector then detects the presence of said capsule. A default value for the volume of beverage to prepare is computed and displayed by the user-interface. The capsule positioner is opened, allowing the capsule to enter the chamber of the brewing unit, the brewing unit is closed, and the beverage is prepared according to the default value.

EXAMPLE 2

The ingredient processing module is configured to prepare a first volume of beverage if the user has pressed a first button, or a second volume of beverage if the user has pressed a second button. The default value is set to the first volume if the first value is the most frequently selected value amongst the last eleven values previously used, or to the second volume if the second value is the most frequently selected value amongst the last eleven values previously used. If the default value is set to the first volume, then the first button is lightened and the second button is not lightened. If the default value is set to the second volume, then the second button is lightened and the first button is not lightened. Then the user has a visual feedback of which default value is proposed.

EXAMPLE 3

The type of the capsule inserted in the preparation module is recognized. The default value is computed by determining the most frequently selected value for the at least one property, amongst the last eleven values previously used for this recognized type of capsules.

EXAMPLE 4

A default value has been computed corresponding to the first volume, and the ingredient processing module has already began the preparation of the first volume of beverage according to the default value. However the selection element is used by the user to select the second volume before the end of the preparation process. The processing module is configured to take into consideration this event: if the second volume is greater than the first volume, the processing module is configured to continue the preparation of the beverage until the second volume is reached. If the second volume is smaller than the first volume, if the volume of beverage already produced is inferior to the second volume, the processing module may be configured to continue the preparation of the beverage until the second volume is reached, or to stop the preparation if the volume of beverage already produced is greater of equal to the second volume.

The invention claimed is:

1. A beverage preparation machine comprising:
a user-interface having:
a selection element configured to receive a user selection of a first value related to at least one property of a beverage;
a feedback element configured to present a default value for the first value, the default value being computed according to values previously used for said at least one property by the machine to prepare beverages; and
another user-interface element other than said selection element to trigger the preparation process according to the default value if no value was selected with said selection element;
an ingredient processing module for a preparation of a beverage according to the first value, with at least one ingredient supplied in a capsule;
an interaction logger configured to record in a log the first value used by the ingredient processing module for preparing the beverage; and
a controller adapted to compute the default value according to the content of the log.

2. The beverage preparation machine of claim 1, wherein the controller is adapted to compute the default value by determining the most frequently chosen value according to the content of the log.

3. The beverage preparation machine of claim 1, wherein the controller is adapted to compute the default value by determining a mean value based upon the content of the log.

4. The beverage preparation machine of claim 1, wherein the controller is adapted to compute the default value by determining a most-likely value based upon the content of the log and information related to one or a combination of the following data: current time, current date, identification data related to the capsule, and recipes for preparing the beverages.

5. The beverage preparation machine of claim 1, wherein the user-interface is configured to set the first value to the default value after each preparation of a beverage and/or at each power-up of the machine.

6. The beverage preparation machine of claim 1, wherein the at least one property relates to a volume of beverage to be prepared.

7. The beverage preparation machine of claim 1, wherein the at least one property relates to a recipe for preparing a beverage.

8. The beverage preparation machine of claim 1, wherein the selection element is adapted to allow modifications of the first value during the preparation of the beverage, the ingredient processing module being configured to take into consideration said modifications for preparing said beverage if still possible to prepare said beverage.

9. The beverage preparation machine of claim 1, further comprising:
a positioner arranged to hold at least one capsule, and
a sensing arrangement adapted to detect an event related to the insertion by a user of a capsule and/or the presence of the capsule on or into the positioner;
wherein the machine is configured, upon detection of the event, to transfer the capsule to the ingredient processing module by using transfer means, and then to start the preparation of the beverage.

10. The beverage preparation machine of claim 9, wherein the sensing arrangement is adapted to detect the event by receiving or reading information from the capsule, and/or by measuring at least one of the following characteristics of the capsule: spectral property, colour, electrical property, resistivity, capacitance, electromagnetic property, magnetic induced field, mechanical property, geometry, weight, identifying information, code bar, and emitted or reflected signal.

11. The beverage preparation machine of claim 9, wherein the sensing arrangement is further adapted to identify a type for the capsule, and wherein the machine is configured to start the preparation of the beverage according to parameters adapted to, or depending on, the identified type of the capsule.

12. The beverage preparation machine of claim 9, wherein the machine is further configured to transfer the capsule to the ingredient processing module upon detection of the event as soon as the machine is ready to start the preparation of a beverage with the capsule.

13. The beverage preparation machine of claim 9 wherein the ingredient processing module comprises a first part and a second part which are movable relative to one another, said processing module being configurable into an opened position wherein a passage is provided between the first and second part for allowing the insertion of a capsule, the machine further comprising closing means arranged to close at least partially the passage, the machine being further configured to operate the closing means so as to open the passage upon the detection of the event, the closing means being driven by a motorized arrangement for opening the passage upon the detection of the event.

* * * * *

UNITED STATES PATENT AND TRADEMARK OFFICE
CERTIFICATE OF CORRECTION

PATENT NO.         : 10,007,397 B2
APPLICATION NO.    : 14/396899
DATED              : June 26, 2018
INVENTOR(S)        : Francois Besson and Alexandre Perentes Page 1 of 1

It is certified that error appears in the above-identified patent and that said Letters Patent is hereby corrected as shown below:

In the Specification

Column 8, Line 1: After "outer casing" insert -- 27 --

Column 8, Line 58: After "control unit" insert -- 11 --

Signed and Sealed this
Twenty-eighth Day of May, 2019

Andrei Iancu
*Director of the United States Patent and Trademark Office*